US012589358B2

(12) United States Patent
Beck et al.

(10) Patent No.: US 12,589,358 B2
(45) Date of Patent: Mar. 31, 2026

(54) PROCESS FOR MANUFACTURING A STERILIZING FILTER

(71) Applicant: GAMBRO LUNDIA AB, Lund (SE)

(72) Inventors: Christof Beck, Bitz (DE); Rainer Blickle, Bitz (DE); Stefan Ermantraut, Balingen (DE); Bernd Hertzler, Balingen (DE); Steffen Wagner, Messstetten (DE)

(73) Assignee: GAMBRO LUNDIA AB, Lund (SE)

( * ) Notice: Subject to any disclaimer, the term of this patent is extended or adjusted under 35 U.S.C. 154(b) by 669 days.

(21) Appl. No.: 17/787,430

(22) PCT Filed: Dec. 29, 2020

(86) PCT No.: PCT/EP2020/087960
§ 371 (c)(1),
(2) Date: Jun. 20, 2022

(87) PCT Pub. No.: WO2021/136769
PCT Pub. Date: Jul. 8, 2021

(65) Prior Publication Data
US 2023/0024203 A1      Jan. 26, 2023

(30) Foreign Application Priority Data
Dec. 31, 2019      (EP) ..................................... 19220174

(51) Int. Cl.
*B01D 63/02*          (2006.01)
*B01D 69/08*          (2006.01)

(52) U.S. Cl.
CPC ......... *B01D 63/021* (2013.01); *B01D 69/081* (2013.01); *B01D 69/087* (2013.01); *B01D 2313/56* (2013.01); *B01D 2323/42* (2013.01); *B01D 2323/58* (2022.08); *B01D 2323/62* (2022.08)

(58) Field of Classification Search
CPC .. B01D 63/021; B01D 69/081; B01D 69/087; B01D 2313/56; B01D 2323/42; B01D 2323/58; B01D 2323/62
See application file for complete search history.

(56) References Cited

U.S. PATENT DOCUMENTS

| | | | |
|---|---|---|---|
| 4,276,687 | A | 7/1981 | Schnell |
| 2013/0210596 | A1* | 8/2013 | Hattori ..................... D06H 7/00 |
| | | | 493/287 |
| 2019/0247801 | A1* | 8/2019 | Miki ...................... B01D 71/68 |
| 2020/0024575 | A1* | 1/2020 | Harimoto ............... A61M 1/34 |

FOREIGN PATENT DOCUMENTS

| | | |
|---|---|---|
| EP | 2567750 | 3/2013 |
| EP | 2636442 | 9/2013 |
| EP | 3195921 | 7/2017 |
| EP | 3388141 | 10/2018 |
| WO | WO2017127625 | 7/2017 |

OTHER PUBLICATIONS

PCT Search Report and Written Opinion prepared for PCT Application No. PCT/EP2020/087960, completed Mar. 30, 2021.

* cited by examiner

*Primary Examiner* — George R Koch
*Assistant Examiner* — Christopher C Caillouet
(74) *Attorney, Agent, or Firm* — Barnes & Thornburg LLP

(57) ABSTRACT

The present disclosure relates to a process for manufacturing a sterilizing filter comprising a plurality of hollow fiber membranes having a large inner diameter.

13 Claims, 1 Drawing Sheet

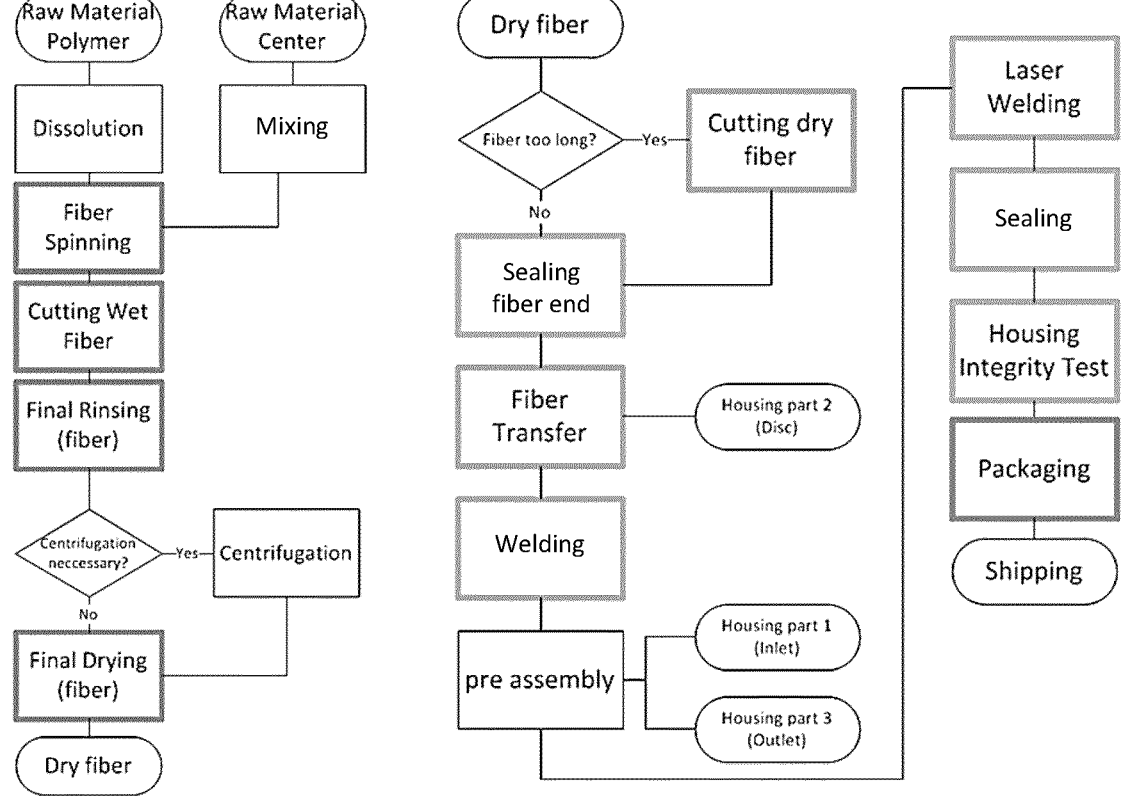

PROCESS FOR MANUFACTURING A STERILIZING FILTER

CROSS-REFERENCE TO RELATED APPLICATIONS

This application is a national stage entry under 35 U.S.C. § 371(b) of PCT International Application No. PCT/EP2020/087960, filed Dec. 29, 2020, which claims the benefit of European Patent Application Serial No. 19220174.7, filed on Dec. 31, 2019, the entire disclosures of both of which are incorporated herein by reference.

TECHNICAL FIELD

The present disclosure relates to a process for manufacturing a sterilizing filter comprising a plurality of hollow fiber membranes having a large inner diameter.

DESCRIPTION OF THE RELATED ART

Liquids destined to be infused into a patient's body, in particular into the bloodstream of a patient, have to be free of pyrogens and particulate matter. To protect the patient, infusion solutions therefore typically are passed through a filter device installed in the infusion line before they enter the patient's body. Commercially available devices generally comprise a microporous flat sheet membrane. Filter devices comprising hollow fiber membranes instead of flat sheet membranes also have been proposed.

EP 3 405 277 A1, EP 3 431 171 A1 and EP 3 388 141 A1 disclose semipermeable hollow fiber membranes having a large inner diameter and comparatively thin walls, as well as sterilizing filters for dead-end filtration of medical liquids comprising these semipermeable hollow fiber membranes.

However, a manufacturing process for such sterilizing filters that can be performed on an industrial scale has not yet been available.

U.S. Pat. No. 4,276,687 A discloses a process for producing capillary fiber bundles involving winding the fibers onto a reel member to form an annular assembly of the fibers, and thereafter cutting the annular assembly into separate bundles. Individual bundles are wrapped in a flexible sheet and cut at their ends.

EP 3 195 921 A1 relates to a microporous hollow fiber filter membrane having a large inner diameter and a thin wall and to a method for producing the membrane and a filter device comprising a single hollow fiber membrane.

EP 2 636 442 A1 relates to porous hollow fiber membranes having a low molecular weight cut-off, processes for their production, and their use for separation tasks in the field of biotechnology, pharmaceutical technology or food processing.

EP 2 567 750 A1 relates to a semipermeable asymmetric hollow fiber membrane comprised of a graft copolymer of at least one hydrophobic polymer and at least one hydrophilic polymer, processes for the preparation of the membranes and devices comprising the membranes.

WO 2017/127625 A1 discloses a sterile solution product bag including a sterilization grade filter integrated directly into the product bag such that microbial and particulate matter filtration can be performed using the filter directly at the point of fill. The filter includes a single hollow fiber filter membrane contained in a stem connected to a bladder of the product bag.

SUMMARY

The present disclosure provides a process for manufacturing a sterilizing filter comprising a plurality of hollow fiber membranes having a large inner diameter. The sterilizing filter is configured for dead-end filtration of liquids for infusion into a patient.

BRIEF DESCRIPTION OF THE DRAWINGS

FIG. 1 is a flow chart of the process of the present disclosure.

DETAILED DESCRIPTION

The present disclosure provides a process for manufacturing a sterilizing filter comprising a plurality of hollow fiber membranes having a large inner diameter. Hollow fiber membranes having a large inner diameter suitable for sterilizing filters as well as designs for sterilizing filters have been disclosed in EP 3 405 277 A1, EP 3 431 171 A1 and EP 3 388 141 A1.

FIG. 1 shows a flowchart of the manufacturing steps of the process of the present disclosure.

Polymer raw materials are dissolved in a solvent to prepare a polymer solution (spinning solution). In one embodiment, the spinning solution comprises at least one polysulfone (PSu), polyethersulfone (PESU), or polyarylethersulfone (PAES) and at least one polyvinylpyrrolidone (PVP). In one embodiment, the spinning solution additionally comprises a polymer bearing cationic charges. Examples of suitable polymers bearing cationic charges include polyethyleneimines, modified polyethylene-imines, and modified polyphenyleneoxides.

In one embodiment, the spinning solution is obtained by dissolving at least one polyethersulfone, at least one polyvinylpyrrolidone, and at least one polymer bearing ammonium groups, in N-methyl-2-pyrrolidone.

In one embodiment, the polymer solution comprises from 15 to 20 wt %, relative to the total weight of the polymer solution, of polyethersulfone, and from 10 to 15 wt %, relative to the total weight of the polymer solution, of polyvinylpyrrolidone, and from 0.03 to 2 wt %, relative to the total weight of the solution, of at least one polymer bearing ammonium groups selected from polyalkyleneoxides bearing ammonium groups, in particular quaternary ammonium groups, and polyvinylpyridines or copolymers of vinylpyridine and styrene bearing ammonium groups, in particular quaternary ammonium groups.

Suitable polymers bearing ammonium groups include polyalkyleneoxides bearing quaternary ammonium groups and polyvinylpyridines bearing quaternary ammonium groups, e.g., N-alkylpyridinium groups.

Suitable counter ions for the ammonium groups include chloride, bromide, sulfate, hydrogen sulfate, trifluoromethane sulfonate, carbonate, hydrogen carbonate, phosphate, hydrogen phosphate, dihydrogen phosphate, acetate, lactate, and citrate. In one embodiment, the counter ion is chloride. In another embodiment, the counter ion is bromide. In still another embodiment, the counter ion is sulfate.

In one embodiment, the polymer solution comprises from 0.03 to 2 wt %, e.g., 0.05 to 1 wt %, or 0.1 to 0.5 wt %, relative to the total weight of the solution, of a polymer bearing ammonium groups. In one embodiment, the ammonium groups are quaternary ammonium groups. In one embodiment, the polymer bearing ammonium groups has a number average molecular weight of 50 to 2,000 kDa, e.g., 100 to 250 kDa, for instance, 150 to 200 kDa. In another embodiment, the polymer bearing ammonium groups has a weight average molecular weight of 10 to 500 kDa, e.g., 150 to 200 kDa.

In one embodiment, the polymer bearing ammonium groups is a block copolymer of epichlorohydrin and alkylene oxide that has been reacted with a bifunctional amino compound, e.g. DABCO. In one embodiment, 30 to 50% of the chlorine atoms in the block copolymer of epichlorohydrin and alkylene oxide have been substituted by DABCO. In one embodiment, the ion exchange capacity of the polymer bearing ammonium groups is in the range of from 1.5 to 2.5 mmol/g, e.g., 1.7 to 2.1 mmol/g.

In another embodiment, the polymer bearing ammonium groups is a polyvinylpyridine having a weight average molecular weight of 150 to 200 kDa, wherein 3 to 8 mol % of the pyridine groups in the polyvinylpyridine have been transformed into N-alkylpyridinium groups with sulfate as counter ion.

The concentration of polyethersulfone in the polymer solution generally is in the range of from 15 to 20 wt %, for instance, 17 to 19 wt %.

In one embodiment, the polymer solution comprises a polyethersulfone having a weight average molecular weight Mw in the range of from 90 to 95 kDa is used. An example is a polyethersulfone having a weight average molecular weight Mw of 92 kDa and a polydispersity Mw/Mn of 3. In another embodiment, polymer solution comprises a polyethersulfone having a weight average molecular weight Mw in the range of from 70 to 80 kDa is used. An example is a polyethersulfone having a weight average molecular weight Mw of 75 kDa and a polydispersity Mw/Mn of 3.4.

The concentration of polyvinylpyrrolidone in the polymer solution generally is in the range of from 10 to 15 wt %, e.g., from 11 to 12 wt %.

In one embodiment of the process, the polymer solution comprises a high 100 kDa) and a low (<100 kDa) molecular weight PVP. In one embodiment, 50-60 wt %, e.g., 50-55 wt %, based on the total weight of PVP in the polymer solution, is high molecular weight component, and 40-60 wt %, e.g., 45-50 wt %, based on the total weight of PVP in the polymer solution, is low molecular weight component.

In one embodiment, the polymer solution comprises 5 to 6 wt % of a polyvinylpyrrolidone having a weight average molecular weight of 50 kDa; and 6 to 7 wt % of a polyvinylpyrrolidone having a weight average molecular weight of 1,100 kDa.

In one embodiment, the polymer solution comprises from 4 to 6 wt %, e.g., 5 wt %, relative to the total weight of the solution, of water.

The components of the center fluid are mixed to prepare the center fluid. In one embodiment, the center fluid comprises 35 to 50 wt % of water and 50 to 65 wt % of NMP, for instance, 35 to 45 wt % of water and 55 to 65 wt % of NMP, or 40 to 50 wt % of water and 50 to 60 wt % of NMP, e.g., 40 wt % of water and 60 wt % of NMP, relative to the total weight of the center fluid.

The spinning solution and the center fluid are delivered to a spinning machine that produces a continuous hollow fiber membrane filament.

The hollow fiber membrane is produced by a continuous solvent phase inversion spinning process comprising extruding the spinning solution through an outer ring slit of a nozzle with two concentric openings into a precipitation bath while simultaneously extruding the center fluid through the inner opening of the nozzle.

In one embodiment of the process, the precipitation bath is comprised of water. In one embodiment of the process, the precipitation bath has a temperature in the range of from 70 to 99° C., for instance, 75 to 95° C., or 85 to 90° C.

In one embodiment of the process for preparing the membrane, the temperature of the spinneret is in the range of from 50 to 60° C., e.g., 52-56° C.

In one embodiment of the process, the distance between the opening of the nozzle and the precipitation bath is in the range of from 10 to 90 cm, e.g., 15 to 60 cm.

In one embodiment of the process, the spinning speed is in the range of 5 to 15 m/min, e.g., 8 to 13 m/min.

In one embodiment, the hollow fiber membrane has an inner diameter of from 2.8 to 4.0 mm, for instance, from 3.0 to 3.7 mm, or from 3.1 to 3.5 mm; and a wall thickness of from 100 to 500 μm, for instance, from 180 to 320 μm. The outer diameter of the hollow fiber membrane is larger than 3 mm and smaller than 4.5 mm. In one embodiment, the ratio of inner diameter to wall thickness of the membrane is larger than 10, or even larger than 15.

In one embodiment, the hollow fiber membrane has a mean flow pore size, determined by capillary flow porometry, in the range of from 0.2 to 0.5 μm.

Capillary flow porometry is a liquid extrusion technique in which the flow rates through wet and dry membranes at differential gas pressure are measured. Before measurement, the membrane is immersed in a low surface tension liquid (e.g., a perfluoroether commercially available under the trade name Porofil®) to ensure that all pores including the small ones are filled with the wetting liquid.

By measuring the pressure at which the liquid is pressed out of the pores their corresponding diameter can be calculated using the Laplace equation. With this method, the pore size distribution of those pores that are active in the mass transport is determined. Dead-end and isolated pores are omitted. The hollow fiber membranes are measured inside-out.

$$Dp = 4Y \cos \theta / \Delta P \qquad \text{Laplace equation:}$$

Dp=diameter of pores [m]
Y=surface tension [N/m]; for Porofil® 0.016 [N/m]
ΔP=pressure [Pa]
Cos θ=contact angle; for complete wetting cos θ=1

After the spinning process, the hollow fiber membrane is recovered from the precipitation bath by an arrangement of driven rollers and fed to a cutting unit wherein the continuous hollow fiber filament is cut into segments having a predefined length by a rotating blade while the hollow fiber membrane is still wet.

In one embodiment, the predefined length is in the range of from 5 cm to 40 cm, for instance, from 20 cm to 40 cm, e.g., 30 cm.

The hollow fiber membrane is cut while it is still wet. As the hollow fiber membrane is still very delicate at this stage, and highly susceptible to mechanical damage or collapse, it is important that mechanical stress to the hollow fiber membrane is minimized. The arrangement of driven rollers and the rotating blade make sure that the hollow fiber membrane is not deformed or damaged and that the ends of the segments are not frayed.

The hollow fiber membrane segments are collected and transferred into a rinsing tube and rinsed with purified water (distilled water, DI water, or RO water) to remove residual leachable constituents. In one embodiment, an additional centrifugation is performed after the rinsing step, to further decrease the residuals content of the hollow fiber membrane segments. The hollow fiber membrane segments are kept inside the rinsing tube also during the centrifugation.

The hollow fiber membrane segments are subsequently dried while still being in the rinsing tube. In one embodiment, the rinsing tube is placed inside a drying oven to dry the hollow fiber membranes. In another embodiment, a flow of hot air is conducted through the rinsing tube. In still another embodiment, the water is removed by reducing the pressure inside the rinsing tube by connecting it to a vacuum pump. After drying, the dry hollow fiber membrane segments are removed from the rinsing tube and processed further.

If the dry hollow fiber membrane segments are longer than required for the final product, they are cut to the required length, the predefined final length. In one embodiment, several hollow fiber membranes having the length required for the sterilizing filter are cut from one long hollow fiber membrane segment. In one embodiment, the long hollow fiber membrane segments are arranged on a fiber support having bores connected to a vacuum line, fastened on the support by applying a vacuum to the outside surface of the hollow fiber membranes, and cut to a predefined length by blades inserted into corresponding notches of the fiber support.

In the next step, one end of the hollow fiber membrane is sealed. In one embodiment, the seal is generated by melting the end of the hollow fiber membrane. In another embodiment, the seal is generated by crimping or clamping the end of the hollow fiber membrane, i.e., by applying heat and pressure. In still another embodiment, the seal is generated by sealing the end of the hollow fiber membrane with a sealing material, e.g., an adhesive or a reactive resin.

After that, the number of hollow fiber membranes required in the sterilizing filter are transferred to a disc having the corresponding number of bores having a diameter which matches the outer diameter of the hollow fiber membranes. The open ends of the hollow fiber membranes are threaded into the bores of the disc and welded to the wall of the bores by heat welding. The hollow fiber membrane is tightly connected with the disc during the welding process.

The disc is comprised of a thermoplastic material. Suitable thermoplastic materials for the disc include polyolefins; polyesters like polycarbonates; acrylic polymers like MMA or SMMA; polyamides like nylon; SAN; SBA; and ABS. In one embodiment, the disc comprises glycol-modified polyethylene terephthalate (PETG).

The disc comprises an IR absorber, i.e., a material which absorbs infrared light. The IR absorber is dispersed in the polymer matrix of the disc. Suitable IR absorbers include carbon black; inorganic pigments like Lazerflair® pigments, copper phosphates or indium tin oxide (ITO); and organic pigments which have a high absorption in the wavelength range of from 700 to 1500 nm.

In one embodiment, the thermoplastic polymer contains from 0.1 to 10 wt.-%, e.g., from 1 to 5 wt.-% of IR absorber, relative to the total weight of the thermoplastic polymer. In a particular embodiment, the disc is comprised of PETG comprising 3 to 5 wt.-% carbon black.

In one embodiment of the process, the transfer of the hollow fiber membranes to the disc and the welding step are performed by a single apparatus which comprises a moveable picker arm having grooves which are in fluid connection with a suction device, e.g., a vacuum pump, and are configured to hold a hollow fiber membrane. The number of grooves in the picker arm corresponds to the number of hollow fiber membranes present in the sterilizing filter. The picker arm pick up the required number of hollow fibers and threads them into the bores of the disc. The apparatus also comprises at least one heated metal pin having a conical shape, the maximum diameter of the heated metal pin being larger than the inner diameter of the hollow fiber membranes. In one embodiment, the at least one heated metal pin is covered with a non-stick coating. In one embodiment, the number of heated metal pins is equal to the number of fibers, i.e., the number of grooves on the picker arm.

A heated metal pin is inserted into the open end of each of the hollow fiber membranes protruding from the disc to widen it. The temperature of the pin is lower than the melting temperature of the hollow fiber membrane. The hollow fiber membrane softens at the temperature of the pin and the open end of the hollow fiber membrane is formed into a cone.

In the next step, a heated metal pin welds the hollow fiber membrane to the disc. The temperature of the welding pins is higher than in the previous step and sufficient to melt the thermoplastic material of the disc. During the welding process, the hollow fiber membrane is pressed into the bore of the disc, so that the open end of the hollow fiber membrane is flush with the surface of the disc after the welding step.

Then the disc comprising the hollow fiber membranes is transferred into a housing which comprises a header component with a fluid inlet and a tubular component with a fluid outlet. The hollow fiber membranes protruding from the disc are inserted into the tubular component and the face of the disc having the open ends of the hollow fiber membranes is covered by the header component. This step is called pre-assembly.

The housing comprises a header component having an inlet for a liquid. In one embodiment, the header component shows cylindrical symmetry, the axis running through the inlet. The header component covers the face of the disc with the open ends of the hollow fiber membranes.

The housing further comprises a tubular component having an outlet for a liquid. In one embodiment, the tubular component shows cylindrical symmetry, the axis running through the outlet. The tubular component encloses the hollow fiber membranes protruding from the disc, it provides a housing for the fibers. Therefore, the length of the tubular component is larger than the length of the hollow fiber membranes protruding from the disc, so that the hollow fiber membranes fit into the tubular component. Generally, the length of the tubular component exceeds the length of the hollow fiber membranes protruding from the disc, so that there is a gap between the sealed end of the hollow fiber membranes and the outlet. In one embodiment, the width of the gap is in the range of from 0.1 to 10 mm.

After the housing and the disc have been assembled, the housing and the disc are joined by Laser welding with an IR Laser and the housing is sealed to produce the finished sterilizing filter. The disc acts as an absorber for the IR radiation.

After testing the integrity of the housing of the sterilizing filter, the filter is packed and is ready for shipment.

The invention claimed is:

1. A process for the production of a sterilizing filter comprising a plurality of hollow fiber membranes, comprising a) producing a continuous hollow fiber membrane filament having an inner diameter of from 2.8 to 4.0 mm, an outer diameter larger than 3 mm and smaller than 4.5 mm, and a ratio of inner diameter to wall thickness larger than 10 by a continuous solvent phase inversion spinning process;

b) cutting the continuous hollow fiber filament into segments having a predefined length by a rotating blade while the hollow fiber membrane is still wet;

c) collecting the hollow fiber membrane segments, transferring them into a rinsing tube, and rinsing them with purified water to remove residual leachable constituents;

d) optionally, centrifuging the membranes within the rinsing tube;

e) drying the hollow fiber membrane segments within the rinsing tube;

f) optionally, cutting the hollow fiber membrane segments to a predefined final length;

g) sealing one end of the hollow fiber membrane segments;

h) transferring a number of hollow fiber membrane segments required for the sterilizing filter to a disc having the corresponding number of bores with a diameter matching the outer diameter of the hollow fiber membranes, threading the open ends of the hollow fiber membrane segments into the bores of the disc and welding them to the wall of the bores by heat welding;

i) transferring the disc comprising the hollow fiber membranes into a housing which comprises a header component with a fluid inlet and a tubular component with a fluid outlet;

j) joining the disc and the housing by Laser welding with an IR Laser and sealing the housing.

2. The process of claim 1, wherein the number of fibers in the sterilizing filter is in the range of from 5 to 8.

3. The process of claim 1, wherein the hollow fiber membrane has a mean flow pore size, determined by capillary flow porometry, in the range of from 0.2 to 0.5 µm.

4. The process of claim 1, wherein the predefined length is in the range of from 5 cm to 40 cm.

5. The process of claim 1, wherein the hollow fiber membrane segments are dried within the rinsing tube in a drying oven.

6. The process of claim 1, wherein the hollow fiber membrane segments are dried within the rinsing tube using a flow of hot air.

7. The process of claim 1, wherein one end of the hollow fiber membrane segments is sealed by applying heat and pressure to it.

8. The process of claim 1, wherein the hollow fiber membrane segments are transferred to the disc using a moveable picker arm having a number of grooves corresponding to the number of hollow fiber membranes present in the sterilizing filter, each groove being in fluid connection with a suction device and being configured to hold a hollow fiber membrane.

9. The process of claim 1, wherein the open end of the hollow fiber membrane segment is welded to the wall of the bore using a heated metal pin having a conical shape.

10. The process of claim 9, wherein the heated metal pin is covered with a non-stick coating.

11. The process of claim 9, wherein the maximum diameter of the heated metal pin being larger than the inner diameter of the hollow fiber membrane.

12. The process of claim 1, wherein the process comprises centrifuging the membranes within the rinsing tube.

13. The process of claim 1, wherein the process comprises cutting the hollow fiber membrane segments to a predefined final length.

* * * * *